UNITED STATES PATENT OFFICE.

HERMAN FLECK, OF GOLDEN, COLORADO, ASSIGNOR TO THE PEROXIDE SPECIALTY COMPANY, OF ST. LOUIS, MISSOURI, A CORPORATION OF MISSOURI.

PROCESS OF OXIDIZING BARIUM MONOXID TO DIOXID.

1,349,417. Specification of Letters Patent. Patented Aug. 10, 1920.

No Drawing. Application filed November 5, 1917, Serial No. 200,285. Renewed October 29, 1919. Serial No. 334,324.

*To all whom it may concern:*

Be it known that I, HERMAN FLECK, a citizen of the United States, residing at Golden, in the county of Jefferson and State of Colorado, have invented certain new and useful Improvements in Processes of Oxidizing Barium Monoxid to Dioxid; and I do hereby declare the following to be a full, clear, and exact description of the invention, such as will enable others skilled in the art to which it appertains to make and use the same.

This invention relates to the oxidation of barium monoxid to form barium dioxid, the addition of the oxygen to the barium monoxid, to form barium dioxid, taking place according to the well known chemical reaction illustrated by the following equation:

$$2BaO + O_2 = 2BaO_2.$$

Processes heretofore proposed for bringing about this conversion of barium monoxid into barium dioxid are subject to the objections and limitations that they require a porous or cellular barium monoxid for good results, and that it is difficult to secure complete conversion even when some form of rabbling of the mass is used for exposing fresh surfaces of the material.

The present invention relates to a process which enables the conversion to take place in a rapid and thorough manner with resulting substantially complete conversion of the monoxid into dioxid and with the production of a product in a finely comminuted state adapting it particularly for further reaction or for use where a finely divided product of high purity is desired.

According to the present invention, the charge of barium monoxid is placed in a drum or suitable container, which is capable of being made air-tight, and which is provided with means for maintaining an oxidizing gas, for example, air under pressure therein. The drum or cylinder is so constructed that it may be revolved at a suitable speed. In it are placed rods or cylinders or balls, preferably of iron, which serve to keep the charge agitated and which cause attrition thereof with resulting exposure of fresh surfaces of the monoxid. Various types of apparatus are available for carrying out this combined agitation and attrition, as will be readily understood. The common forms of ball mills or tumbling barrels may thus be used, provided they are made air-tight and arranged to withstand the necessary pressure.

The oxidizing gas, *e. g.* air which is passed into or over the barium monoxid, is preliminarily dried in any suitable manner, as by freezing out the moisture by refrigeration, or by passing the air through towers or cylinders containing barium monoxid, quick lime, caustic soda, or similar material which will remove the moisture and preferably also carbon dioxid. Materials such as barium monoxid may thus be distributed upon a porous material such as clinker or coke or other suitable material. So, also, combinations of different procedures may be utilized for removing the moisture and carbon dioxid, such as refrigeration followed by passage of the thus preliminarily dried air over absorbent material for removal of any additional amounts of moisture and of carbon dioxid.

The dry oxidizing gas *i. e.*, the air or oxygen, is admitted to the charge in the drum which is kept at the proper temperature by external heat from any convenient source, such as a coal, oil or gas furnace or fire or heater or an electrical heater. The heat is communicated through the drum to the charge which is thereby brought to the proper temperature, preferably between 400 and 600° C. The reaction may be begun at even lower temperatures and may even proceed at temperatures above 600°, provided the pressure of the air or oxygen is kept sufficiently high. The temperatures referred to are those preferred for obtaining uniform oxidation.

During the process, the drum or cylinder is rotated and the charge thereby kept agitated and subjected to attrition, so that the particles of the charge are crushed and finely divided and thereby rendered more susceptible to reaction with the dry air or oxygen brought into contact therewith. Thus, as the surfaces of the particles are oxidized, the attrition will remove such surfaces or break up the particles and expose fresh surfaces so that the reaction will proceed in a thorough and continuous manner.

The agitation and attrition of the charge will moreover serve to bring fresh portions of the charge into contact with the heated drum and to bring about a thorough mixture of the charge, so that thorough and uniform heating will be effected, as well as thorough and uniform reaction.

This method of procedure is particularly advantageous where the charge of barium monoxid is of a dense nature so that penetration by the air or oxygen is difficult. The attrition will break up the dense particles or remove the surfaces therefrom to expose the fresh surfaces for fresh action. The attrition which is obtained in the drums or cylinders above described is particularly effective, inasmuch as the balls or like material within the drum subject the particles of the barium monoxid to a combined squeezing, rubbing and percussive action, well adapted for bringing about the desired thorough mixture, comminution and reaction.

The air or oxygen supplied to the drum or cylinder may be compressed in any suitable manner, or obtained from a source of the compressed gas. Where air is used, provision will be made for the escape of the nitrogen and for the supply of a current of air during the process. When compressed oxygen is used, it will not usually be necessary to provide for any relief from the apparatus.

The pressure under which the air or oxygen is supplied may vary within rather wide limits, but for best results it is preferable to keep this pressure between 20 and 60 lbs. per square inch, the pressure being regulated and controlled in any suitable or appropriate manner.

The progress of the reaction may at all times be noted and followed by withdrawing a sample of the charge from the drum or cylinder.

As a result of the process of the present invention, there is obtained a product in a finely divided state and one which is, moreover, oxidized to a high degree and relatively free from unoxidizing portions of barium monoxid. The product is, therefore, well adapted for use for purposes where a product of high strength and purity and fine state of subdivision is desired.

The process of the present invention is of particular value in the treatment of dense barium monoxid which is of limited penetration and which is not well adapted for use in the processes of oxidation heretofore commonly practised. Thus, even though the mass may be fused, and, as a result, be dense and compact, it may nevertheless be readily oxidized and converted by the process of the present invention. It will be evident also that porous barium monoxid is likewise amenable to the present process with like or similar advantages and economy in its oxidation. That is to say, the same porous or cellular barium monoxid which is required by the processes commonly heretofore practised can be utilized according to the present invention and its porosity supplemented by the comminution and attrition to which it is subjected. In the case of a more compact barium monoxid, such as one which has become pasty or semi-pasty at some stage of its production or treatment, conversion can nevertheless be readily effected according to the present invention.

The process of the present invention is, moreover, simple in character and one which enables the results to be obtained in a comparatively short time.

I claim:

1. The method of oxidizing barium monoxid to barium dioxid which comprises subjecting the barium monoxid to attrition, and bringing an oxidizing gas into contact therewith at an oxidizing temperature during the attrition.

2. The method of oxidizing compact or dense barium monoxid to barium dioxid which comprises bringing a compressed oxidizing gas into contact therewith at an oxidizing temperature, and subjecting the charge to attrition during the oxidation to agitate and comminute the particles of the charge and expose fresh surfaces for the progress of the oxidation.

3. The method of oxidizing barium monoxid to barium dioxid which comprises bringing a dry carbon-dioxid-free compressed oxidizing gas into contact therewith at an oxidizing temperature and subjecting the charge to a combined squeezing, rubbing and percussive action to cause attrition thereof and to expose fresh surfaces for contact with the compressed oxidizing gas during the progress of the oxidation.

4. The method of oxidizing barium monoxid to barium dioxid which comprises subjecting the barium monoxid to attrition in a revolving container, and bringing a dry carbon dioxid free oxidizing gas into contact therewith at an oxidizing temperature.

5. The method of oxidizing barium monoxid to barium dioxid, which comprises subjecting the barium monoxid to attrition, bringing compressed air into contact therewith at an oxidizing temperature during the attrition, and drawing off during the operation the excess nitrogen.

6. The method of oxidizing compact or dense barium monoxid to barium dioxid, which comprises bringing compressed air into contact therewith at an oxidizing temperature, subjecting the charge to attrition during the oxidation to agitate and comminute the particles of the charge and expose fresh surfaces for the progress of the oxidation, and taking away the excess nitrogen during the operation.

7. The method of oxidizing barium monoxid to barium dioxid which comprises bringing dry carbon-dioxid-free compressed air into contact therewith at an oxidizing temperature, subjecting the charge to a combined squeezing, rubbing and percussive action to cause attrition thereof and to expose fresh surfaces for contact with the compressed oxidizing gas during the progress of the oxidation, and taking away the excess nitrogen during the operation.

8. The method of oxidizing barium monoxid to barium dioxid which comprises subjecting the barium monoxid to attrition in a revolving container, bringing a dry carbon dioxid free oxidizing gas into contact therewith at an oxidizing temperature, and taking away the excess nitrogen during the operation.

In testimony whereof I affix my signature.

HERMAN FLECK.